Nov. 30, 1971   B. B. BAREFOOT   3,623,297
FLUE GAS SCRUBBER

Filed June 23, 1969   3 Sheets-Sheet 3

INVENTOR.
BERNARD B. BAREFOOT
BY
his ATTORNEY

United States Patent Office 3,623,297
Patented Nov. 30, 1971

3,623,297
FLUE GAS SCRUBBER
Bernard B. Barefoot, 4404 Gateway Drive,
Monroeville, Pa. 15146
Filed June 23, 1969, Ser. No. 842,427
Int. Cl. B01d 47/10
U.S. Cl. 55—257        1 Claim

ABSTRACT OF THE DISCLOSURE

Apparatus and method for removing particulate matter from gases which exit from a cupola, electric melting furnace, basic oxygen furnace, or the like by providing a vertical cylinder with a tapered throat in which a smaller disc is vertically adjusted by overhead mechanism including a hollow rod for increasing or decreasing the cross-sectional area between the periphery of the disc and the tapered throat of the wall. Water is introduced into the hollow rod above the disc and flows downwardly and over the top of the disc surface to the periphery where it is atomized by shearing action caused by downward velocity of gas extracted by an induced draft fan. Pivotal doors may also be used in place of the disc.

---

This invention relates to a gas scrubber for cleaning gases which contain particulate matter which exit from apparatus such as a cupola, an electric melting furnace, a basic oxygen furnace, and the like.

An outstanding disadvantage of existing gas scrubbers is that they do not effectively remove particulate matter from the gases even sufficiently to satisfy legislative requirements without the use of very cumbersome and expensive equipment.

An object of my invention is to overcome the above-named disadvantages and to achieve a substantial removal of the particulate matter from the gases and satisfy the legislative requirement that gases released into the atmosphere shall have a particulate matter content of no more than a specified quantity or weight, also to do so by relatively simple apparatus.

A more specific object of my invention relates to conveying the gases containing particulate matter from the apparatus (cupola, electric furnace or basic oxygen furnace) and then contacting the gases with water to wet or saturate the particulate matter so as to cause the particulate matter to be suspended in the water. The wetting or saturation of the particulate matter causes the particulates to combine with the water forming a slurry and subsequently allows the cleaned gases to pass to atmosphere.

A further object of the invention is to provide a novel method for effectively removing particulate matter from gases generated in steel making furnaces and the like.

Other objects and advantages will become more apparent from a study of the following description, taken with the accompanying drawing wherein.

Figure 1:
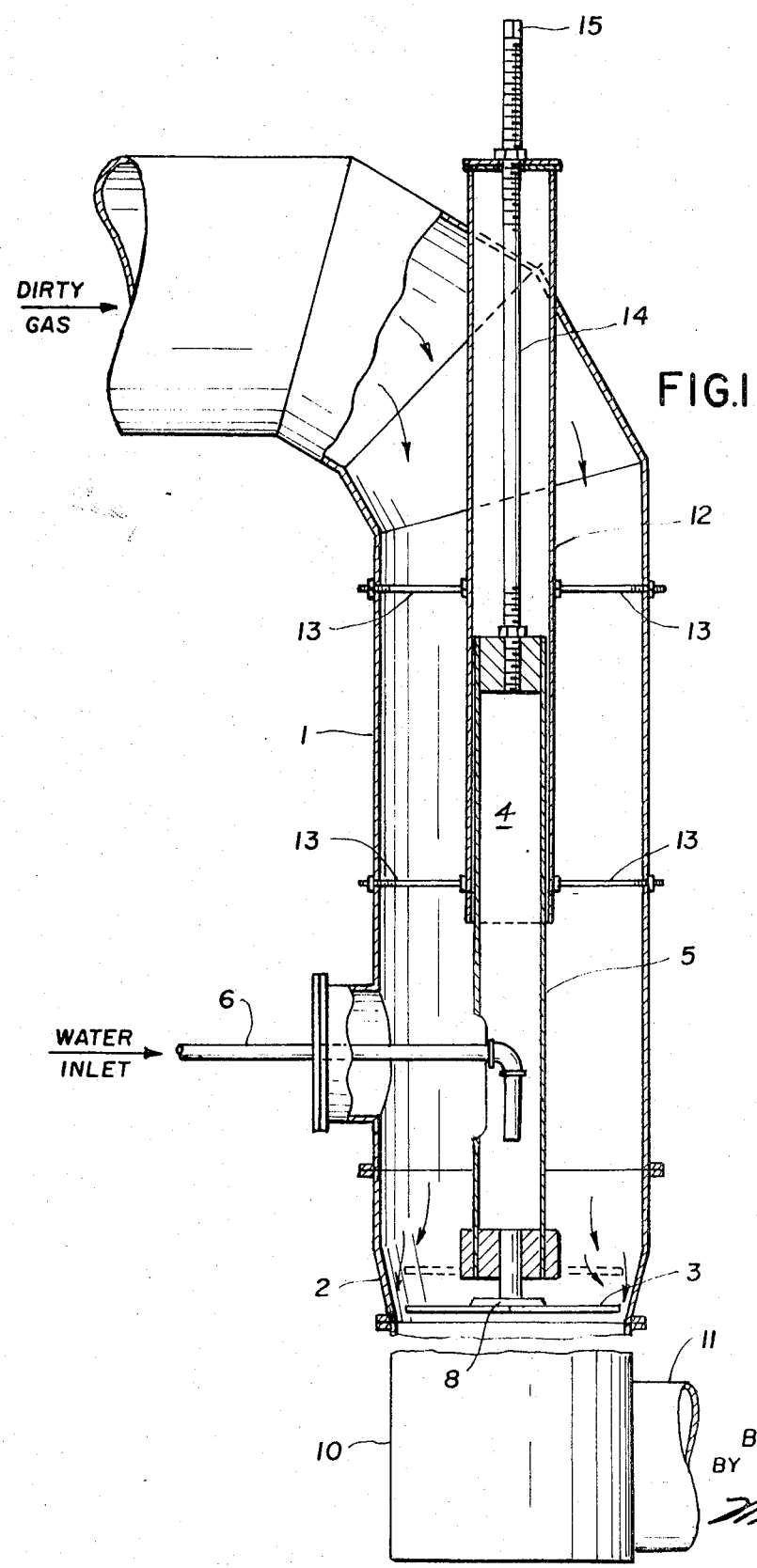
FIG. 1 is an elevational view, partly in cross-section, showing apparatus for carrying out gas scrubbing according to the principles of the present invention.

Referring more particularly to FIG. 1 of the drawing, numeral 1 denotes a scrubber which comprises a vertical cylinder with a tapered throat 2 for restricting the gases. A smaller circular horizontal plate or disc 3 is held inside the tapered throat and moved vertically in the throat by an overhead mechanism 4 (hydraulic cylinder or motor) connected by a hollow rod for increasing or decreasing the cross-sectional area between the periphery of the disc and the wall of the tapered throat. Water is introduced by pipe 6 into the hollow rod above the circular disc 3 and falls downward inside the hollow rod 5 to an outlet 8 located centrally on top of the circular disc surface. The water flows over the top of the disc surface to the periphery of the circular disc and is atomized at its periphery by shearing action caused by the downward velocity of the gas extracted from the apparatus by an induced draft fan. The shearing action causes the water to atomize into small droplets which then collide and wet (saturate) the particulate matter. Some of the particulate matter is the nucleus or nuclei for the water droplets. The water droplets containing particulate matter is either entrained in the gas stream or dropped out to form a slurry. A plenum chamber 10 is provided after the scrubber for collecting or settling the entrained water and particulate into the slurry water.

Cylinder 12 is centrally supported in scrubber 1 by a plurality of radial rods 13. Positioning rod 14 is adjusted vertically by turning the squared end 15 of a threaded portion thereof.

A gas pump (fan) is provided to withdraw the gases containing particulate from the apparatus along paths shown by the arrows and through the adjustable restricted area between the periphery of the circular disc 3 and the tapered throat 2 of the scrubber, thereby effecting a pressure drop to the gases when passing through the restricted cross-sectional area. This pressure drop produced by the restricted cross-sectional area of the scrubber releases work energy to the gases, thereby resulting in the removal through pipe 11 of the particulate matter from the gases. As the pressure drop of the gases passing through the restricted cross-sectional area is increased, the efficiency of gas cleaning is also increased.

Cylinder 12 serves as a guide for vertical adjustment movement of hollow rod 5.

The principle of scrubbing (fume) dirty gases requires the generation of water droplets of sufficient quantity and size so as to collide with the airborne dust particles conveyed in the gas stream to effect an agglomeration of the dust particles with the water to form a slurry.

Figure 2:
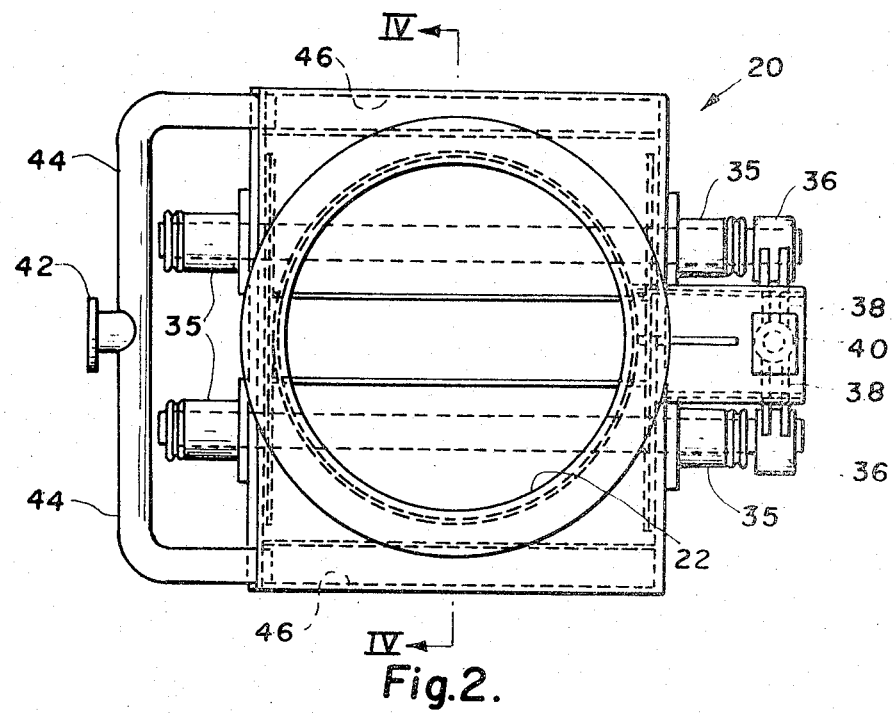
FIGS. 2 and 3 are top and elevational views, respectively, of a modification.
Figure 3:
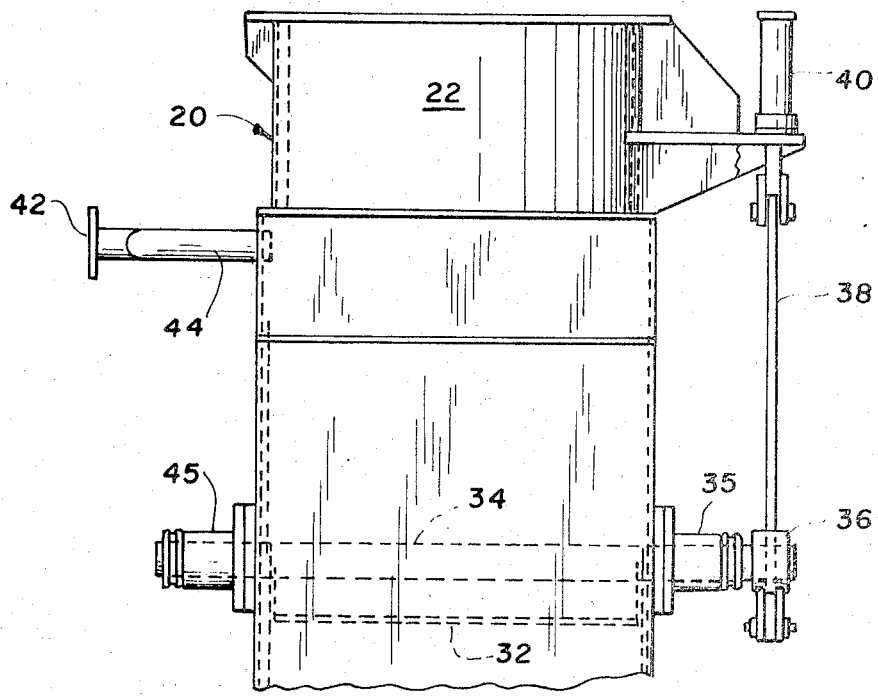
Figure 4:
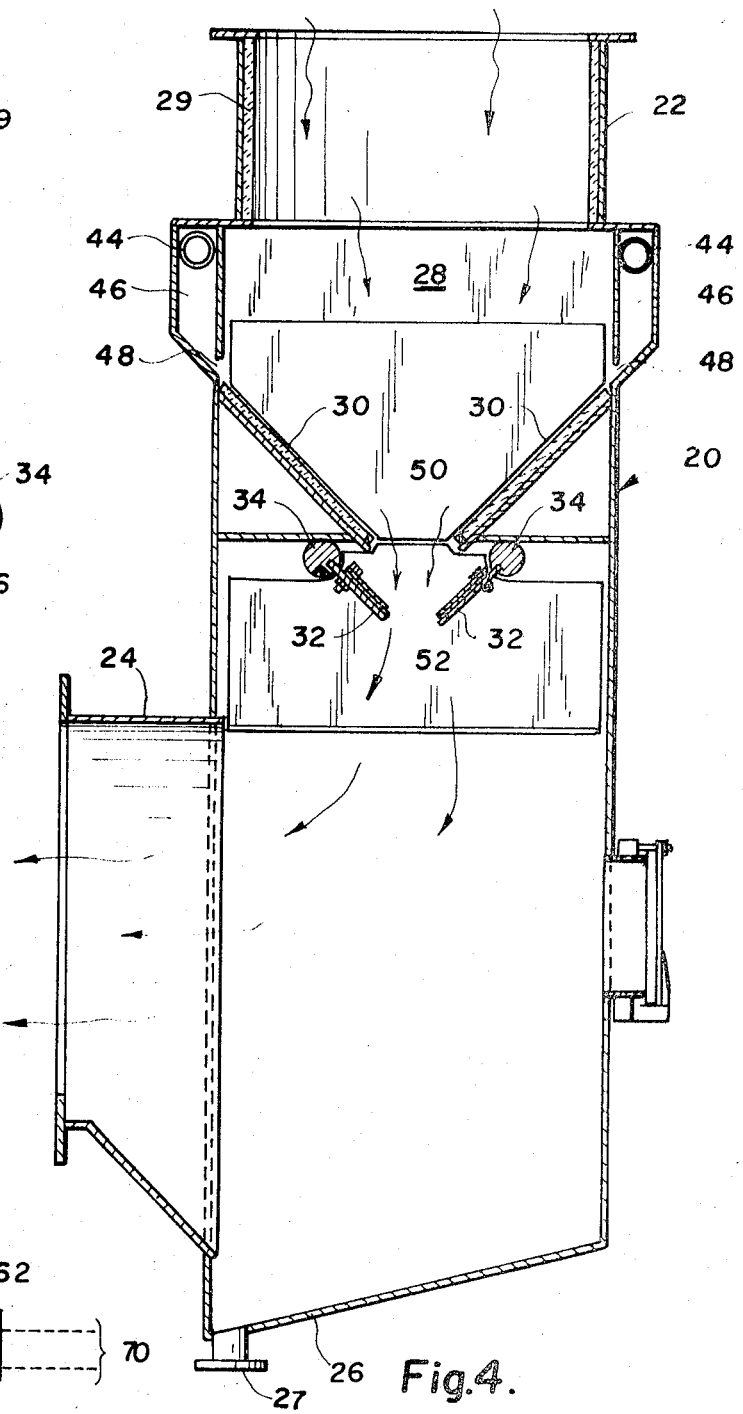
FIG. 4 is a vertical cross-sectional view of the modification.

The generation of water droplets in the high energy vane scrubber, of the present invention, is accomplished in the modification shown in FIGS. 2, 3 and 4, by introducing water, the scrubber media, through inlet pipes 42, 44 around the periphery or any external segment 46 of the scrubber housing at a given dynamic head or pressure. The internals of the vane scrubber consist of a tapered inclined section 48 from either two sides or from all around the periphery to direct the water (media) by gravity into a square or rectangular throat section 30 so that the water when ascending the tapered inclined sections collides with itself at the throat. This throat opening is properly sized and designed to permit the ultimate collision of the ascending water with itself.

Directly beneath this first throat 30, two articulating doors 32 are positioned so as to provide and vary in size the cross-section area opening of the second throat orifice. The doors for changing the cross-section area of the throat orifice can be either powered or adjusted manually.

Figure 5:
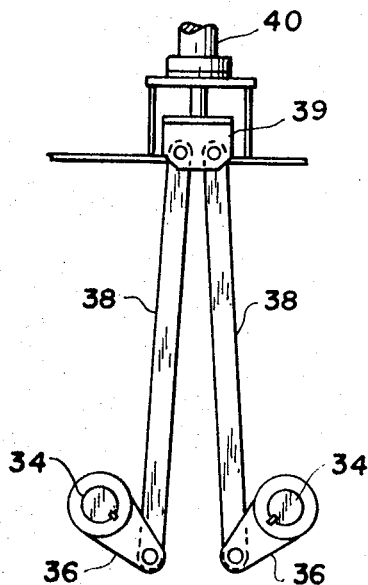
FIG. 5 is an enlarged, fragmentary view of the door operator.

FIG. 5 shows the operating means for adjustable doors 32 and comprises a hydraulic cylinder 40 which drives clevis 39 to which are pivoted links 38 pivotally connected to crank arms 36 rigidly secured to vane shafts 34 rotatable within the bearings 35 (see FIGS. 2 and 3).

Figure 6:
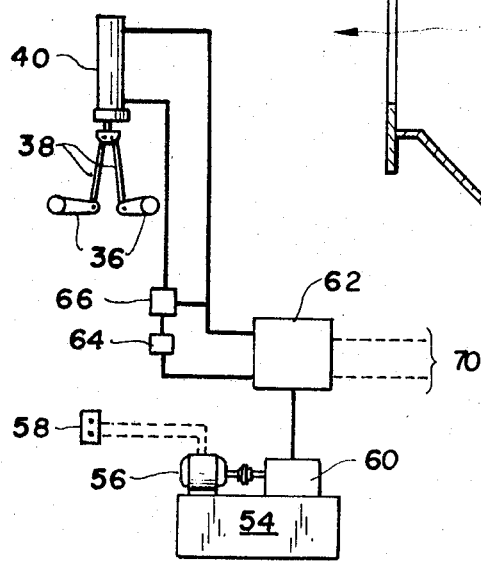
FIG. 6 is a schematic view of the door operator controls.

FIG. 6 shows the electrical control system for powering the operating means shown in FIG. 5 which is actuated by signal 70 from an ammeter which operates a 4-way solenoid valve 62 for controlling the flow of fluids in opposite directions through cylinder 40, which fluid passes through flow control valve 64 and check valve 66. Connected to solenoid valve 62 is a hydraulic pump 60 driven by an electric motor 56 and which pump is connected to a reservoir 54. The motor is operated by a start-stop pushbutton switch 58.

In operation, the dirty gas is introduced through housing 22 internally lined with castable refractory 29 into space 28 from which it is drawn simultaneously with the water (media) through the first throat 50 where the water collides with itself and then subsequently through the adjustable throat orifice 52. The gas and water are then both accelerated by both being pulled through the two throats within housing 20.

The stream of water ascending the tapered inclined throat section provides, by collision, a shearing action of the water, thereby causing the water to break into water droplets to effect collision of these droplets of water with the airborne dust particles.

The water, upon entering the adjustable throat orifice 52, is then further atomized into millions of fine water particles which collide with and further capture the dust particles.

Further collision and agglomeration is evidenced beneath the adjustable throat orifice due to the acceleration of gas colliding with the water droplets inside the vessel.

To further effect the collision and agglomeration of the dirty gas (fume) with the water, a water filled sump elbow 26, 27 is provided as a cushion to absorb the accelerated energy of the gas stream at the elbow of the scrubber, thus preventing erosion due to the impact. The water sump in the elbow then serves two functions—as the impactor for the energy and the disintegrator to agglomerate the fume.

To maintain optimum pressure drop at different gas volumes, the articulating doors 32 are opened or closed to increase or decrease the cross-section area through which the gas and water must pass simultaneously.

The system just described has the following advantages:

(1) The water when descending down the tapered inclined sections into the throat by gravity, represents an increase in cleaning efficiency for no additional cost because the forces of these streams of water when colliding with each other break the water into droplets for collision with the fume particles.

(2) The adjustable throat orifice is positioned directly beneath the first throat so that more shearing action is provided for the water, thereby generating more water droplets to collide with the fume.

(3) The open space beneath the scrubber with the water filled sump elbow provides an increase in cleaning efficiency because the escaped fume particles will when accelerated strike the water surface in the sump and become agglomerated with the water.

The construction shown in FIG. 1 has the following outstanding advantages:

With the overhead mechanism for moving vertically the horizontal plate within the tapered throat by a vertical connecting hollow rod for increasing and decreasing the pressure drop (change in cross-sectional area), the following are realized.

(1) The velocities of the gases have not yet been accelerated, thereby the wear or erosion of parts will be considerably less than if this vertical connecting hollow rod were placed beneath the horizontal plate.

(2) Water, the scrubbing media to the vertical hollow rod, is introduced above the horizontal plate by gravity rather than with a water pump.

(3) The velocities of the gases after passing the horizontal plate will decrease more rapidly than if the vertical connecting hollow rod were placed beneath the horizontal plate. This feature will permit more of the entrained water in the gases to drop out and therefore effect a dryer gas leaving the scrubber.

Thus it will be seen that I have provided an efficient gas scrubber which has important advantages which include efficient, economics and low maintenance cleaning of particulate matter laden gases, together with the ability to easily meet any legislative requirements for removing particulates from gases.

While I have illustrated and described several embodiments of my invention, it will be understood that these are by way of illustration only, and that various changes and modifications may be made within the contemplation of my invention and within the scope of the following claims.

I claim:

1. Gas scrubbing apparatus for removing particulate matter in a gas which exits from a steel making furnace or the like, comprising a vertically extending cylindrical enclosure having a downwardly and inwardly tapered throat, an imperforate disc contained within said throat, a first hollow cylinder supporting said disc and extending vertically upwardly therefrom within said cylindrical enclosure in coaxial relationship therewith, a second hollow cylinder surrounding said first hollow cylinder to serve as a guide therefor, adjusting means extending vertically upwardly from said second hollow cylinder for adjusting the vertical relationship of said first hollow cylinder therewith to adjust the vertical position of said disc within said throat, a water inlet pipe extending through said enclosure and through an opening in the side wall of said first hollow cylinder, said water inlet having a downwardly extending nozzle portion for discharging water vertically downwardly onto the top central portion of said disc whereby said water will flow radially outwardly on the top surface of said disc, so as to vary the pressure drop and atomize the water by shearing action caused by downward velocity of the gas, and a plenum chamber directly underneath said disc for collecting the entrained water.

References Cited

UNITED STATES PATENTS 3,116,348  12/1963  Walker _____ 261—44

OTHER REFERENCES

Catalog HE12, Western Precipitation Division, Joy Manufacturing Co., 757 3rd Ave., New York, N.Y., pp. 1–3.

REUBEN FRIEDMAN, Primary Examiner

R. W. BURKS, Assistant Examiner

U.S. Cl. X.R.

261—62, 116, 118